E. W. KUHN.
PROCESS OF MANUFACTURING STERILE BUTTER AND CREAM.
APPLICATION FILED AUG. 18, 1910.
1,067,743.
Patented July 15, 1913.
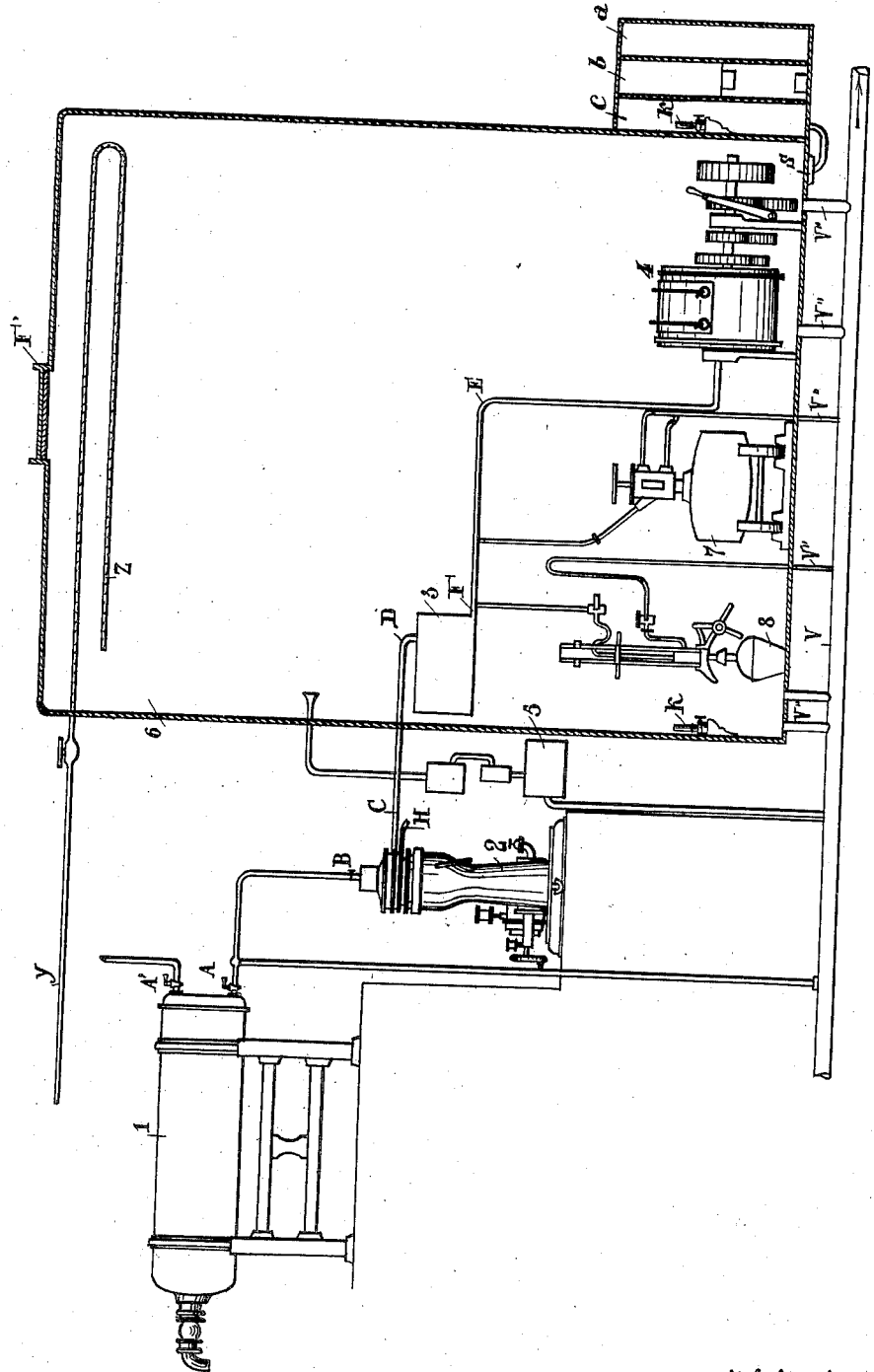
WITNESSES:
W. A. Berrigan
Alfred R. Anderson
INVENTOR
ETIENNE WILLIAMS KUHN,
by H. van Oldenzeel
Attorney.

UNITED STATES PATENT OFFICE.

ETIENNE WILLIAMS KUHN, OF LONDON, ENGLAND.

PROCESS OF MANUFACTURING STERILE BUTTER AND CREAM.

1,067,743.　　　　　　Specification of Letters Patent.　　Patented July 15, 1913.

Application filed August 18, 1910. Serial No. 577,871.

*To all whom it may concern:*

Be it known that I, ETIENNE WILLIAMS KUHN, a citizen of the French Republic, and residing at London, S. E., England, have invented new and useful Improvements in Processes of Manufacturing Sterile Butter and Cream; and I do hereby declare the following to be a full, clear, and exact description of the same.

Heretofore, the fresh cream obtained from fresh milk in centrifugal machines, was pasteurized at 80° Celsius for the purpose of destroying the alterating ferments contained therein and producing butter which may be conserved much longer time than butter produced from non-pasteurized cream. However, the pasteurization at 80° Celsius does not destroy all the ferments contained in milk and which may be divided in two classes (according to Dr. Flugge's experiments): the aerobic bacteria and the anaerobic bacteria. The latter include the series of the *Bacillus butyricus botkin*, the spores of which are capable of resisting to boiling for more than one hour. Now the bacteria of this series are the chief agents of the rancidness of butter, and it is manifest that a simple pasteurization at 80° C. does not destroy them; therefore butter manufactured from pasteurized cream still contains the *Bacillus butyricus* and is subject to rancidness after a certain lapse of time, and in order to avoid this rancidness, this butter is usually mixed with ordinary salt. On the other hand, the pasteurization is limited to 80° C. for the following reasons: If the temperature is raised above 80° C., the molecules of the fatty substances contained in the cream are united and the molecular consistency is changed to become what is well known as clarified butter. Cream which has been modified in this way, cannot be used for manufacturing normal butter.

The object of this present invention is to avoid these objections by the sterilization of milk in a gyrator, wherein the milk may be completely sterilized at a temperature of 110° C. under high pressure, without modifying its taste and savor or producing clarified butter.

According to recent scientific experiments, the chemical composition of milk is as follows: (1) fatty substances, (2) lactose, (3) nitrogenous substances, (4) mineral salts, (5) soluble ferments or enzyms.

If the milk is sterilized by heat, the fatty substances are not at all injured and their taste and savor are not at all altered. The heat acts on the other elements of the milk and particularly by dehydrating the lactose and mineral salts and deoxidating the lactose and nitrogenous substances. These chemical modifications produced by the heat alter the taste and smell of the sterilized milk. It is possible to avoid this objection and to produce a real deodorization of sterilized milk by the following method: When the cow is freshly milked, the milk being consequently in a crude and fresh state and containing all its soluble ferments and particularly the oxidases, catalases, clastases and peroxidases, it is introduced into the sterilizing gyrator connected to a reservoir of pure oxygen, compressed to a high pressure. The gyrator being completely filled with milk and tightly closed, the compressed oxygen is admitted into the same and the gyrator is rotated in order to saturate the milk with oxygen under a pressure of about 5 atmospheres. The oxygen being formed of two atoms, the oxidases transfer one atom of oxygen upon the lactose and nitrogenous substances, and as oxygen in the atomic state has stronger oxidizing properties than oxygen in the molecular state, it will be immediately combined with these substances. After the completion of this phenomenon, the oxygen which remains dissolved, is completely extracted by the vacuum produced at the top of the gyrator. The milk prepared in this way may be heated and sterilized without the slightest alteration of taste and savor, because now the substances which are capable of being deoxidated by heat cannot be deoxidated and because the high pressure to which the milk is submitted before and during the heating in the gyrator, prevents the lactose from being dehydrated, which would be produced if the milk would be heated to the same temperature under atmospheric pressure. By this method, the sterilized milk is completely deodorized, which result could not be realized heretofore.

The improved process of this present invention comprises the following steps: 1, complete sterilization of the milk under pressure in the gyrator at a temperature of 110° C.; 2, connection of the cock of the gyrator with a metallic centrifugal skimmer; previous sterilization of this connection and the skimmer and aseptic skimming of the sterilized milk, producing fresh absolutely sterile cream, in which therefore any bacteria including the *Bacillus butyricus* are destroyed; 3, sowing of the sterile cream with pure lactic yeast or crude butter and maturation of the cream in filtered air; 4, aseptic churning of the cream thus acidified in rooms containing filtered air; production of butter which contains neither *Bacillus butyricus* nor any other bacteria capable of producing rancidness.

The rancidness of butter is produced according to recent scientific experiments, by the fact that the bacteria, and particularly the series of the *Bacillus butyricus botkin* contained in the milk secrete from the time of milking diastases or lipases which decompose the glycerids of the fatty substances into glycerin and butyric, caproic, caprylic and capric acids. This saponification and production of volatile acids give the butter the taste and smell which characterize rancid butter. This rancidness of butter manufactured according to the old processes can not be avoided by submitting the butter to a low temperature, say $-5°$ C., as this low temperature may well stop the evolution of the ferments but it can not avoid the pure chemical actions of the diastases secreted previously by the bacteria or ferments.

The accompanying drawing shows a complete plant for the manufacture of sterile cream and butter.

This plant comprises a rotary sterilizing gyrator 1 permitting of the sterilization of milk after first extracting the air and oxygen contained therein, by the vacuum produced at the upper part of the gyrator through the valve or cock A'. Compressed air is then substituted for the vacuum and then the sterilization is produced at a temperature of 110° C. under a pressure of 10 atm., whereby the milk is completely sterilized without change of taste and without alteration of any fraction of fatty substance to clarified butter.

The valve A of the gyrator is connected to the steam feed pipe V and to the inlet B of a centrifugal skimmer 2. The outlet C of the latter is connected by a pipe to the inlet D of an enameled metallic reservoir 3, forming the cream maturator and arranged within a closed room 6, into which extends the connecting pipe CD through a hole O. The outlet F of the reservoir 3 is connected by a pipe to the enameled metallic churn 4 arranged downward. The several connecting pipes are made of tinned or amalgamated copper. The walls of the room 6 are entirely metallic and enameled on their inner sides to resist to steam and boiling water. The corners of this room are rounded. The floor of the room is also enameled and inclined so that the water flows naturally to a discharge siphon, forming a hydraulic joint, whereby the interior of the room is never in connection with the outer atmosphere. The steam feed pipe V is connected with the interior of the room 6 through valves V'''. Arranged below the top of the room 6 is a perforated coil-pipe YZ through which boiling water is introduced into the room for sweeping off the walls thereof and purifying the inner atmosphere, this water being discharged through the siphon S. Arranged above the top of the room 6 is a chimney F' obturated by a flap-valve formed of a cotton filter. This hinged flap-valve is opened upwardly when the pressure of the inner fluid raises it and it drops down again by its own weight. At the outside of the room 6 is arranged a small turbo-motor 5 actuating an air compressor serving to force atmospheric air through the cotton filter P into the room 6.

The operation of these apparatus is as follows: After the sterilization of the milk is completed in the gyrator 1, the milk is cooled to the temperature of about 30° C. which is most favorable to the centrifugation thereof. Then steam is admitted from the pipe V through the connection AB, the centrifugal skimmer 2, the connection CD and the reservoir 3 for the purpose of sterilizing these connections and apparatus. At the same time, the room 6 is sterilized by introducing into the same a strong rain of boiling water through the coil YZ, so as to sweep away any impurities through the discharge siphon S. After this introduction of boiling water, the steam valves V'' are opened to admit steam into the room 6, this steam causing the remaining germs and the air to be discharged through the flap-valve F' which is opened by the inner pressure. This introduction of steam completes the sterilization of the room 6. Now the steam valves V'' are again closed and the condensation of steam producing a vacuum within the room 6, atmospheric air is sucked into the latter through the cotton filter F'; furthermore sterile air is forced into said room through the cotton filter P. The sterilization may be assisted by means of formaldehyde lamps K placed within the room 6. The connections AB and CD and the apparatus 2, 3 and the room 6 being sterilized in this way, the valve A of the gyrator will be opened to admit the sterile milk into the skimmer B. The skimmed milk produced in the latter is discharged through the pipe H, while the sterile cream flows through the pipe CD into the maturator 3, into which it arrives in an absolutely sterile state owing to the precautions taken.

If the cream is to be exported in the state of cream, it will be directly received into enameled receptacles 7 or into glass carboys 8, previously sterilized, and after these receptacles or carboys are filled with cream, they will be closed aseptically in the room 6 and of course before they can be brought into contact with germs from the outside. These receptacles or carboys being thus tightly and aseptically closed, can be exported to any distance, the sterile cream they contain, remaining completely unalterable. On the other hand, if the sterile cream collected in the maturator 3 is to be used for the manufacture of butter, it will be held at a suitable temperature and sowed in the maturator either with pure lactic yeast or with lactic yeasts selected from crude butter. The maturation of the cream having reached the necessary degree of acidity, the cream will be brought through the pipe E into the enameled metal churn 4, wherein it is churned aseptically. When discharged from this churn the butter will be put into receptacles which are aseptically closed in the sterile atmosphere of the room 6. In this way the butter is absolutely free from butyric bacteria or any other ferments capable of producing rancidness. It contains only pure lactic ferments which have been introduced into the same in the maturator 3 for the purpose of giving the butter a sweet odor and aroma. This butter which cannot become rancid can be exported to any distance and country in an absolutely unalterable state. Of course, the receptacles in which the sterile butter is inclosed, must be previously sterilized and afterward closed very tightly.

Before entering the room 6, the operator must go through three cabins $a$, $b$, $c$. In the cabin $a$ the operator deposits his garments. In the cabin $b$ he washes himself thoroughly with antiseptic water, and in the cabin $c$ the operator puts on special garments placed in this cabin and previously sterilized by means of a formaldehyde lamp K.

Having fully described my invention, what I claim and desire to secure by Letters Patent is:—

1. An improved process of obtaining fresh sterile cream from milk, said process consisting in completely sterilizing the milk, before the cream is separated therefrom, under pressure and at a temperature of about 110° C.; then skimming the cream from the milk; sowing the cream; and maturing the cream in filtered air.

2. An improved process of obtaining fresh sterile cream from milk, said process consisting in completely sterilizing the milk, before the cream is separated therefrom, under pressure and at a temperature of about 110° C.; and then skimming the cream from the milk.

3. An improved process of manufacturing fresh sterile cream and butter from milk, said process consisting in completely sterilizing the milk under pressure at about 110° C., skimming the cream from the milk, sowing the sterile cream with pure lactic yeast, maturing the cream in filtered air and churning the cream in filtered air.

4. An improved process of manufacturing fresh sterile cream and butter from milk, said process consisting in completely sterilizing the milk under pressure at about 110° C., skimming the cream from the milk, sowing the sterile cream with pure lactic yeast, maturing the cream in filtered air and churning the cream in filtered air, all of said operations being carried on aseptically and in sterilized apparatus.

5. An improved process of manufacturing fresh sterile cream and butter from milk, said process consisting in saturating the milk in a closed vessel with compressed oxygen, forming a vacuum at the upper part of the vessel, heating the milk to about 110° C. under pressure, at the same time agitating the same and then skimming the cream.

6. An improved process of manufacturing fresh sterile cream and butter from milk, said process consisting in saturating the milk in a closed vessel with compressed oxygen, forming a vacuum at the upper part of the vessel, heating the milk to about 110° C. under pressure, at the same time agitating the same, conducting the cream through a pipe to a separator, sowing the cream with pure lactic yeast, maturing the cream in filtered air and churning the cream in a room aerated with filtered air.

7. An improved process of manufacturing fresh sterile cream and butter from milk, said process consisting in saturating the milk in a closed vessel with compressed oxygen, forming a vacuum at the upper part of the vessel, heating the milk to about 110° C. under pressure, at the same time agitating the same, conducting the cream through a pipe to a separator, sowing the cream with pure lactic yeast, maturing the cream in filtered air and churning the cream in a room aerated with filtered air, all of the operations being carried on aseptically and in sterilized apparatus and exposed only to sterilized air.

In testimony whereof, I have signed my name to this specification in the presence of two subscribing witnesses.

ETIENNE WILLIAMS KUHN.

Witnesses:
 FREDERICK ERNEST SQUIRE,
 H. D. JAMESON.